United States Patent [19]

Romblom et al.

[11] 4,448,066
[45] May 15, 1984

[54] FUEL PER PULSE INDICATOR FOR A PULSE ENGINE FUEL INJECTION SYSTEM

[75] Inventors: Edward F. Romblom, Dewitt; Arthur R. Sundeen, Lansing, both of Mich.

[73] Assignee: General Motors Corporation, Detroit, Mich.

[21] Appl. No.: 399,439

[22] Filed: Jul. 19, 1982

Related U.S. Application Data

[63] Continuation-in-part of Ser. No. 293,002, Aug. 14, 1981, abandoned.

[51] Int. Cl.³ .............................................. G01M 15/00
[52] U.S. Cl. ...................................... 73/119 A; 73/252
[58] Field of Search ...................... 73/119 A, 232, 252, 73/3

[56] References Cited

U.S. PATENT DOCUMENTS

3,847,020 11/1974 Jurschak ................................ 73/228
4,328,697 5/1982 Tumber et al. ............................ 73/3

Primary Examiner—Jerry W. Myracle
Attorney, Agent, or Firm—Robert M. Sigler

[57] ABSTRACT

Apparatus for indicating fuel per pulse in a pulsed fuel injection system for an internal combustion engine, especially a diesel engine, includes a magnetic piston axially movable in a cylindrical bore in a fuel line to and from a stopped position blocking an inlet. The piston has an outer diameter just smaller than the inner diameter of the bore and is included in a magnetic circuit including an actuating coil having an inductance varying with piston position. Circuitry provides strong electrical current pulse to the coil prior to injection to move the piston to its stopped position and then provides a substantially weaker AC current to the coil while monitoring the voltage and rate of change of voltage thereacross. The rate of change of voltage indicates when piston movement in response to a fuel injection pulse ceases; and the voltage at the point indicates piston position and therefore fuel quantity injected. The beginning of piston movement, as sensed from said voltage, may also be used to mark time of injection.

8 Claims, 8 Drawing Figures

FUEL PER PULSE INDICATOR FOR A PULSE ENGINE FUEL INJECTION SYSTEM

This is a continuation-in-part of application Ser. No. 293,002, filed Aug. 14, 1981 now abandoned and assigned to the assignee of the present invention.

BACKGROUND OF THE INVENTION

This invention relates to the delivery of injected fuel pulses to the combustion chambers of an internal combustion engine and particularly to the sensing and indication of the quantity of injected fuel per pulse during engine operation. In addition to being useful for engine calibration purposes, such information can be used in a feedback control system to control the actual fuel delivery to an engine during vehicle mounted engine operation. Although useful for spark ignited engines, this invention was conceived and is basically designed for diesel engines, where quantity of injected fuel has, in the prior art, generally been in direct response to operator demand, with perhaps a simple limiting arrangement to reduce smoke during high load operation.

Although fuel quantity measurement systems are not unknown in the prior art, such systems generally take the form of cumbersome laboratory test equipment which is not at all suitable for real time operation on a vehicle. A typical system of this type provides for the insertion of some apparatus in a fuel line of the engine, the operation of the engine under constant conditions for a predetermined number of fuel pulses, the diversion of the fuel in the aforesaid fuel line to a collection device and the subsequent manual measurement of the amount of fuel delivered to said collection device.

SUMMARY OF THE INVENTION

The apparatus of this invention, however, is capable of providing an indication for at least one cylinder of a multicylinder internal combustion engine of the quantity of fuel injected during each consecutive injection pulse of said cylinder during the normal, vehicle driving operation of said engine. As an additional benefit, it may further provide an indication of actual time of injection for said injection pulses with no additional mechanical apparatus and only a small increase in the amount of electronics or computer programming required. The apparatus requires minimal change to an existing engine, since it comprises a sensing unit added to the fuel line of the monitored cylinder adjacent the injector poppet valve and an electronic package which may be mounted in any convenient location.

The invention comprises, in a brief description, a sensing unit inserted in a fuel line adjacent a fuel injection poppet valve and having a cylindrical bore with an inlet and outlet at opposite axial ends, a magnetically responsive piston axially movable in the bore to and from a stopped position blocking the inlet and sized so as to allow restricted fuel flow thereby, a magnetic circuit including the piston and an actuating coil, means effective to apply a strong electric current to the coil to move the piston to its stop position before each injection vent, means effective to apply a weaker alternating electrical current to the coil so that the voltage thereacross varies with axial piston position and means effective to determine from the sensed voltage and the time rate of change therein the axial position at the end of a fuel injection pulse, whereby the quantity of fuel injected is known. In addition, means may be provided to further determine from said voltage the actual time of the beginning of injection. Further details and advantages of this invention will be apparent from the accompanying drawings and following description of the preferred embodiment.

DESCRIPTION OF THE PREFERRED EMBODIMENT

Figure 1:
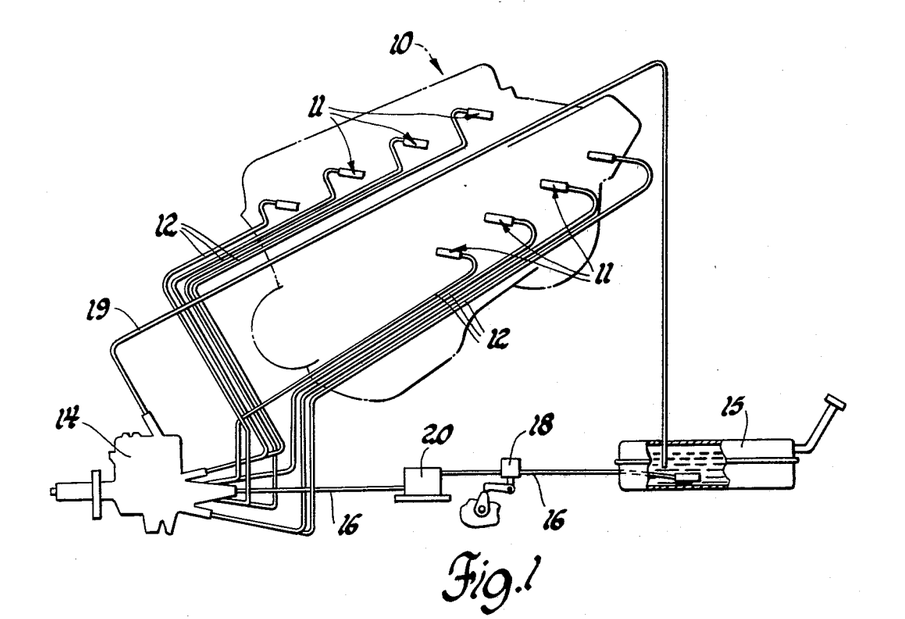
FIG. 1 is a schematic drawing of a fuel injection system for a diesel engine.

Referring to FIG. 1, a diesel engine 10 is provided with a fuel injection system comprising a plurality of fuel injectors 11, one for each cylinder of engine 10, supplied by high pressure fuel lines 12 from an injection pump 14. Injection pump 14 receives fuel from a fuel tank 15 by way of a low pressure fuel line 16 and a low pressure pump 18 and returns fuel to tank 15 by a bypass return line 19. A fuel filter 20 is included in low pressure line 16. The system shown in FIG. 1 is, as described above, standard and well known in the art. It is used with diesel engines made by the Oldsmobile Division of the assignee of this invention and is described in repair manuals and other publications. The injection pump 14 may be one manufactured by the Stanadyne Corporation and described in their publications.

Figure 2:
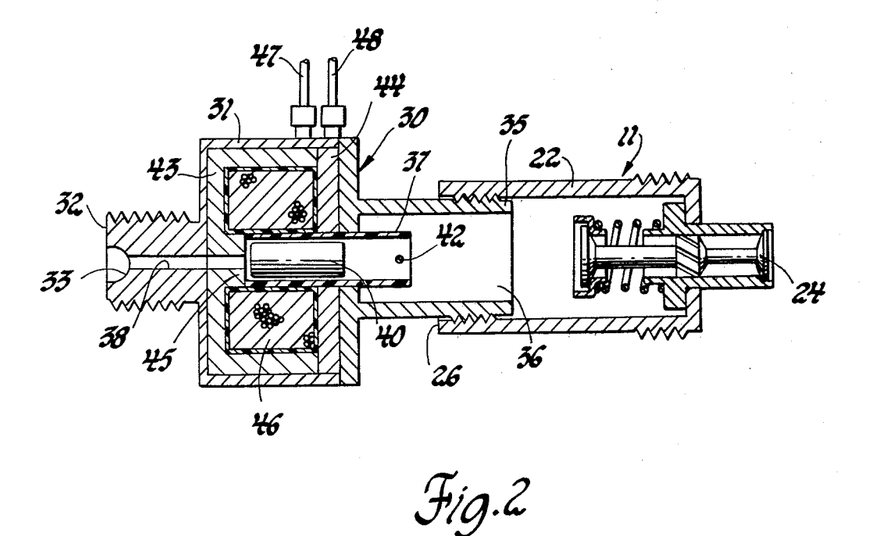
FIG. 2 is an axial cut-away view of an embodiment of a portion of this invention adapted for insertion in one of the fuel injection lines of FIG. 1.

FIG. 2 shows one of the fuel injectors 11 of FIG. 1 combined with a sensing unit 30. Injector 11 includes a housing 22 and a spring loaded, pressure actuated poppet valve 24 which is ordinarily closed but which is opened by the high pressure pulse of fuel from injector pump 14 through high pressure line 12 to allow a portion of this fuel to enter the cylinder of engine 10 for combustion. The injector 11 is shown in FIG. 2 in a somewhat idealized or functional manner for explanatory purposes only; and the structure as shown is not to be taken as any preferred structure, since this portion of the Figure is concerned with a device already known in the prior art. Any suitable pressure actuated injector valve unit can be used in this invention as long as its upstream end 26 is adaptable to receive a sensing unit such as that shown at 30.

Sensing unit 30 has a housing 31 having an inlet end 32 defining an inlet opening 33 and adapted for connection with one of the high pressure lines 12. Housing 31 further has an outlet end 35 defining an outlet opening 36 and adapted for connection with inlet end 26 of injector 11. Inlet opening 33 and outlet opening 36 communicate with opposite axial ends of a cylindrical bore member 37, the connection with inlet opening 33 being through a smaller diameter passage 38. A generally cylindrical piston 40 is axially movable within bore member 37 and is provided with an outer diameter slightly smaller than the inner diameter of bore member 37 but greater than the inner diameter of passage 38. Thus, when piston 40 is moved to its leftmost limit in FIG. 2, it abuts and blocks the passage 38, so that a sudden pulse of incoming high pressure fuel will start it moving to the right. The relationship between the outer diameter of piston 40 and the inner diameter of bore member 37 is such that the fuel may flow around and pass piston 40 on its way to injector 11 but is somewhat restricted so that it tends to pull piston 40 along in the same direction. A stop 42 is provided at the outlet end of bore member 37; but the apparatus is designed such that piston 40 is not expected to reach the stop 42 in normal injection operation.

First and second magnetic polepieces 43 and 44 are contained within housing 31. A portion 45 of magnetic polepiece 43 and bore member 37 define a spool upon which a coil 46 is wound. Piston 40 is made of a magnetic material so that it completes a magnetic circuit with cup-shaped magnetic polepiece 43 and disk-shaped magnetic polepiece 44 with a reluctance that varies with the axial position of piston 40. Since this reluctance helps determine the inductance of coil 46, that inductance also varies with axial position of piston 40. Terminals 47 and 48 provide a connection for the ends of coil 46.

In a brief description of the operation of the apparatus of FIG. 2 during an injection pulse of the system of FIG. 1, the apparatus is initialized with piston 40 blocking inlet passage 38 and a suitable alternating current supplied to coil 46. When injector pump 14 injects a high pressure pulse of fuel into the high pressure line supplying injector 11 of FIG. 2, the pulse reaches piston 40, pushes it away from the inlet passage 38 and flows through bore member 37, dragging piston 40 with it and increasing the pressure in injector 11 so as to open the valve 24 and allow injection of fuel into the cylinder of engine 10. The initial movement of piston 40 creates a change in the inductance of coil 46 which, in turn, creates a change in the voltage across terminals 47 and 48 which can be detected by appropriate apparatus as the voltage passes a first reference to signal the start of injection at the injector itself.

At the end of the high pressure pulse, when the pressure begins to drop and the injector valve 24 begins to close, the rate of change of piston displacement, and therefore of voltage across terminals 47 and 48, will begin to change. When it has changed in such a way as to indicate virtually no further movement, which can be tested with a second reference, the actual displacement of piston 40 and therefore the voltage across terminals 47 and 48 will indicate the actual quantity of fuel that has moved through cylindrical bore member 37 and therefore through injector valve 24 into the cylinder. The movement of the piston will accurately indicate the quantity of fuel which moves by it and thus the quantity which is injected because, as will be shown at a later point in this specification in the description of the embodiment of FIGS. 5-7, there will be an overshoot by the piston as the fluid flow stops which makes up for the initial lag of the piston at the beginning of fluid flow. Thus, by initializing the apparatus of FIG. 2 with the application of a strong current across terminals 47 and 48 before each injection event and then while supplying a weaker alternating current across terminals 47 and 48, monitoring the voltage and rate of change of voltage across those terminals, one can determine the actual start of the injection pulse and the quantity of fuel delivered during the injection pulse.

Figure 3:
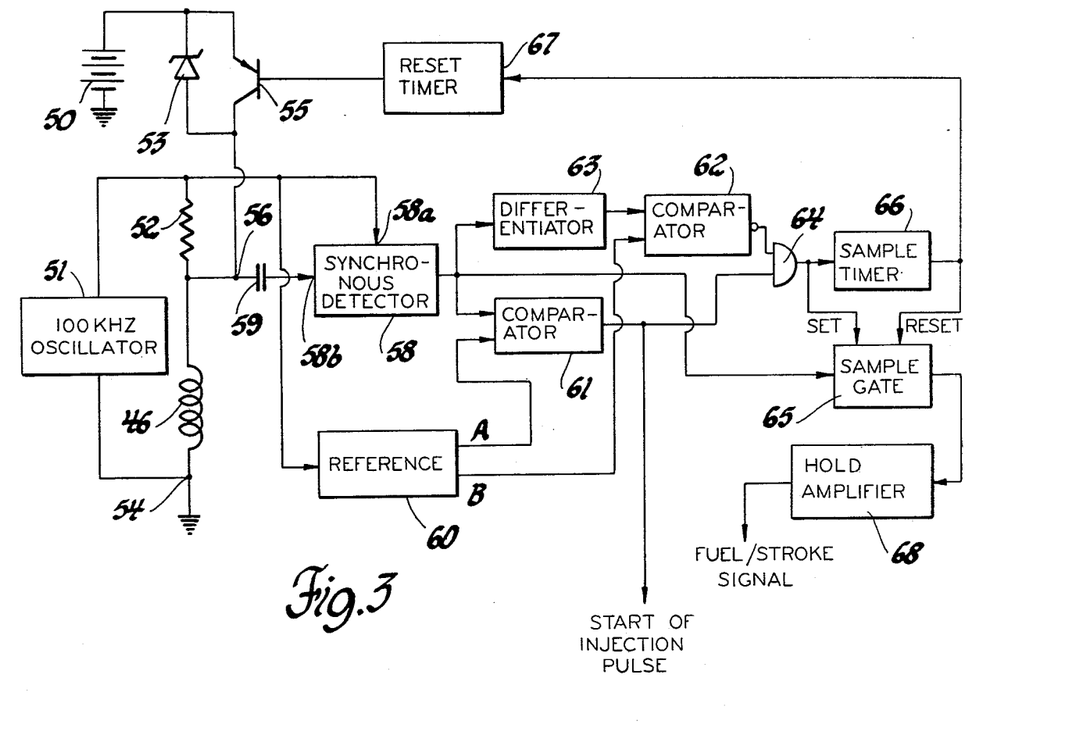
FIG. 3 is a diagram of an electrical control which comprises another portion of this invention and is adapted for use with the portion of FIG. 2.

FIG. 3 shows electrical apparatus adapted for use with the apparatus of FIG. 2 in the above-described manner. The apparatus of FIG. 3 includes a source of direct current 50, which may be the vehicle battery, and a source of alternating current 51 which is, in this embodiment, a 100 kilohertz oscillator. Oscillator 51, of course, ultimately derives its power from battery 50. Coil 46, which symbolizes the inductance of the same numbered coil in FIG. 2, is shown connected in series with a resistor 52 across oscillator 51; and the junction 54 of coil 46 and the oscillator 51 is grounded. A PNP transistor 55 has its collector connected to the junction 56 of coil 46 and resistor 52; and its emitter is connected to the ungrounded side of battery 50. A zener diode 53 with breakdown voltage several times battery voltage but less than the breakdown voltage of transistor 55 is connected across transistor 55. The output of oscillator 51 is provided directly to the synchronizing input 58a of a synchronous detector 58; while junction 56 is connected through a capacitor 59 to the detecting input 58b of synchronous detector 58.

The output of oscillator 51 is further provided to a reference generating circuit 60, which generates, in a manner to be described at a later point, a first reference voltage A applied to a comparator 61 and a second reference voltage B applied to a comparator 62. The output of synchronous detector 58 is provided to the other input of comparator 61 and, through a differentiator 63, to the other input of comparator 62. The outputs of comparators 61 and 62 are combined in an AND gate 64, the output of which is provided to the set input of a sample gate 65 and to the trigger input of a sample timer 66. The output of synchronous detector 58 is further provided to the sampling input of sample gate 65; and the output of sample timer 66 is provided to the reset input of sample gate 65 and to the trigger input of a reset timer 67, the output of which is provided to the base of transistor 55. The output of sample gate 65 is connected to a hold amplifier 68, which holds the fuel per stroke signal voltage. The start of injection pulse is an edge signal obtained from the output of comparator 61.

Figure 4:
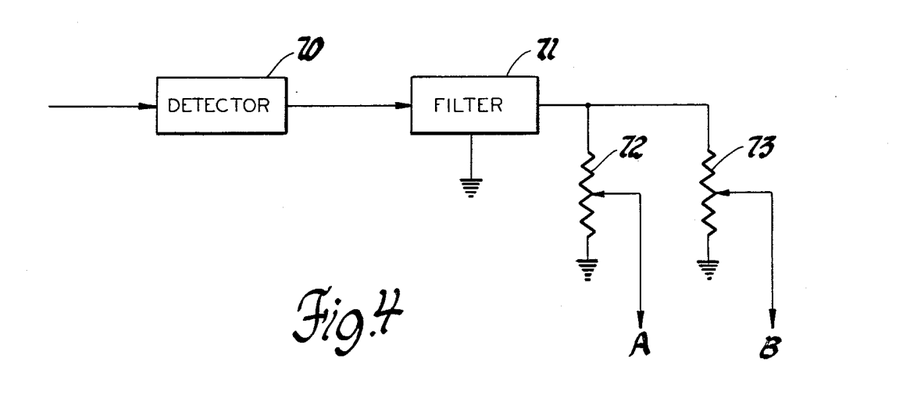
FIG. 4 is a diagram of a reference signal generator for use in the apparatus of FIG. 3.

Before describing the operation of the system of FIG. 3, some of the elements of that system will first be described in more particular detail. Oscillator 51 can be any appropriate oscillator adapted for use with a DC source such as battery 50. Because of its presence, of course, suitable shielding should be provided for the circuit to prevent electromagnetic interference of the 100 kilohertz signal with the vehicle radio or other electronic controls on the vehicle. Synchronous detector 58 can be any suitable synchronous detector or detector circuit capable of providing a direct current analog of the AC voltage across coil 46. Sample timer 66 and reset timer 67 can be any suitable one shot circuits which, when triggered, generate an output signal a predetermined time after the trigger. Sample gate 65 is a simple gating circuit which passes the signal on its sampling input when it receives a set input and stops passing that signal when it receives a reset input. Hold amplifier 68 is a device which maintains the signal supplied on its input after that signal ceases until another signal is supplied. Reference signal generator is described more thoroughly in FIG. 4, in which it is shown to comprise a detector 70, which may be synchronous, with a filter 71 on its output and a pair of voltage divider potentiometers 72 and 73 on the output of the filter providing output voltages A and B respectively. Detector 70 and filter 71 provide a DC analog of the voltage across oscillator 51; and potentiometer 72 and 73 provide fixed ratios of that voltage as references A and B to comparators 61 and 62, respectively, to make this portion of the system ratiometric.

Now the operation of the system of FIG. 3 will be described. Prior to the initiation of an injection event, reset timer 67 turns on transistor 55 to supply a direct current therethrough to coil 46 which generates a magnetic force that draws piston 40 into abutment with the magnetic polepiece 43 at the end of inlet passage 38. The current through transistor 55 is much greater than the 100 kilohertz signal from oscillator 51, which appears only as a ripple thereon. This ripple is of no consequence to the resetting of piston 40; but the oscillator could obviously be turned off during the DC pulse if desired. The reset current does not need to be direct; however, it is convenient and inexpensive to use the already existing vehicle DC power system as a source for the strong reset current.

With the end of the period of reset timer 67, transistor 55 turns off and the 100 kilohertz alternating current signal from oscillator 51 is supplied by itself across the series combination of resistor 52 in coil 46, as well as to synchronous detector 58 and reference signal generator 60. The voltage across coil 46 is applied through capacitor 59, which is included for DC isolation, to synchronous detector 58 which generates in its output a DC representation thereof for comparison with reference A in comparator 61. Reference A is adjusted by potentiometer 72 so that it is just less than the output of synchronous detector 58 with the piston in this initial position. The output of differentiator 63 at this time is, of course, zero, which is below the reference B supplied from potentiometer 73. The outputs of comparators 61 and 62 to AND gate 64 at this time are a low or 0 output from comparator 61 and a high or 1 output from comparator 62.

With the initiation of injection and the initial movement of piston 40 to the right in FIG. 2, the output of differentiator 62 immediately increases past the level of reference B to generate a low or 0 output from comparator 62 to AND gate 64. As the output of synchronous detector 58 decreases, it next passes reference level A so that comparator 61 provides a high or 1 input to AND gate 64 as well as a start of injection pulse signal, which is a pulse edge signal that can be used in other apparatus for a variety of purposes. In all the preceding actions, there has not yet been a combination of two high or 1 inputs to AND gate 64. However, when the injection pulse ends, the decrease in voltage output of synchronous detector 58 begins to slow and the output of differentiator 63 eventually fall below reference level B. At this point the output of comparator 62 switches high so that AND gate 64 is enabled to set sample gate 65 and trigger the sample timer 66. The output of synchronous detector 58 is thus passed by sample gate 65 to hold amplifier 68 where it is held as a quantitative fuel per stroke signal. Almost immediately, sample timer 66 causes a reset of sample gate 65 and triggers reset timer 67 to reinitialize the apparatus of FIG. 2 as previously described.

Figure 5:
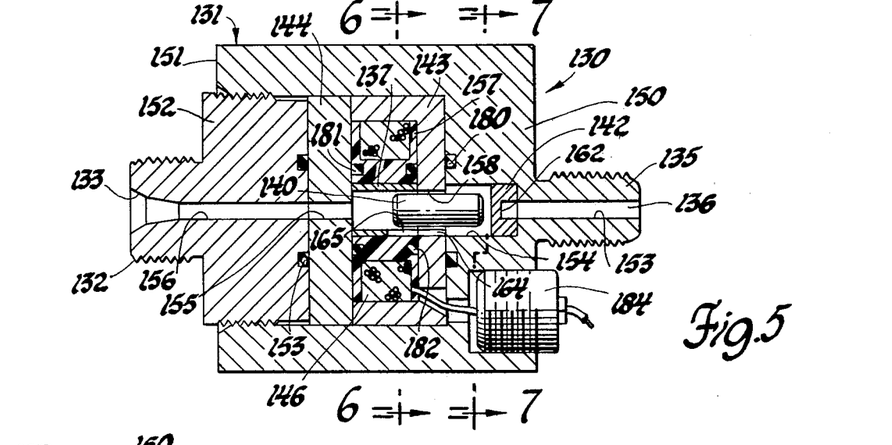
FIG. 5 is an axial cut-away view of an improved embodiment of the sensing unit shown in FIG. 2.
Figure 6:
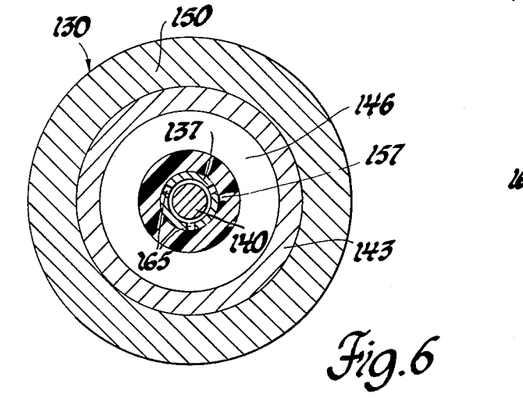
FIG. 6 is a section view along line 6—6 in FIG. 5.

FIG. 5 shows an improved embodiment of the sensing unit 30 of FIG. 2. Actually, sensing unit 130 of FIG. 5 is very similar to sensing unit 30 of FIG. 2 and represents a further step in the development thereof.

Sensing unit 130 includes a generally cylindrical steel housing member or case 150 which is threaddedly attached at its open end 151 to a screw-in steel housing member or plug 152 to form a housing 131 having an inlet end 132 which is threaded for attachment to a fitting in one of fuel lines 2 and includes an inlet opening 133.

Housing member 150, which can also be made of steel, has an outlet end 135 adapted for threaded attachment to injector 11 in a manner similar to that shown in FIG. 2. Outlet end 135 defines an outlet opening 136. Outlet opening 136 communicates with the interior of housing 131 through a cylindrical outlet passage 153 of 1.94 cm diameter and a larger diameter (7.3 cm) cylindrical bore 154 of depth 9.5 cm. A stop member 142 in cylindrical bore 154 adjacent the inner end of passage 153 will be described at a later point in this specification.

A magnetic pole piece 144, having the general shape of a 6.0 cm thick cylindrical disk of outer diameter 29.6 cm, is contained within the interior of housing 131 adjacent the inner end of housing member 152 and axially aligned therewith. A central axial cylindrical opening 155 in magnetic pole piece 144 aligns with a similar axial inlet passage 156 in housing member 152 which ends in inlet opening 133 and creates an inlet bore of 1.94 cm diameter.

A generally cup-shaped magnetic pole piece 143 is included within the interior of housing 131 with its open end adjacent magnetic pole piece 144. The interior of magnetic pole piece 143 contains a spool 157 upon which is wound a coil 146. Magnetic pole piece 143 has an axial bore opening 158 having an inner diameter of 4.2 cm which communicates with the central axial bore (4.1 cm diameter) of a cylindrical bore member 137 within spool 157. Bore member 137 and magnetic polepiece 143 thus define a cylindrical bore with a predetermined inner diameter of 4.1 cm over the first 9.5 cm of length and 4.2 cm over the next 3.2 cm of length, which bore communicates at one end with the smaller diameter axial opening of magnetic polepiece 144 and at the other end with the larger diameter axial bore 154 of housing member 150. In addition, the various bores and openings define an axial flow path through sensing unit 130 from inlet opening 133 to outlet opening 136.

A cylindrical piston 140 of diameter 4.0 cm and length 13.0 cm is contained within the axial bores defined by bore member 137, magnetic polepiece 143 and housing member 150. Piston 140 has an outer diameter slightly smaller than the aforementioned predetermined inner diameter of bore member 137 and magnetic polepiece 143 so that fuel may flow past piston 40, although it will exert a drag force thereon over a significant range of axial positions of piston 140. Piston 140 and magnetic polepieces 143 and 144 may all be made of a ferrite material to reduce eddy current losses at the 100 KHz frequency of the alternating current in coil 146.

Various O-ring seals are provided to prevent leakage of the high pressure fuel out of sensing unit 13. O-ring seal 153 resides in a groove in housing member 152 and seals between that member and polepiece 144. O-ring seal 180 resides in a groove in housing member 150 and seals between that member and polepiece 143. Finally, O-ring seals 181 and 182 reside in grooves on opposite axial ends of spool 157 to seal between that member and polepieces 144 and 143 respectively. The O-rings are made of a resilient material not damaged by diesel fuel or contaminants.

Spool 157 is made of a non-magnetic, fuel resistant plastic; bore member 137 is made of a non-magnetic material such as aluminum oxide. Therefore, the magnetic polepieces 144 and 143, together with coil 146 and piston 140 form a magnetic circuit, the reluctance of which, and therefore the inductance of coil 146, varies with the axial position of piston 140. When the piston 140 is in an extreme left position in contact with magnetic pole piece 144 and completely filling the interior of coil 146, magnetic reluctance is lowest. This is the stopped position to which the piston is reset before each injection pulse by a strong direct current to coil 146 which pulls piston 140 to said position. With the strong current removed and a much smaller alternating current applied to coil 146, piston 140 is free to be moved to the right by the forces exerted by fuel moving past during a fuel injection pulse. As it moves out of the interior of coil 146, the reluctance of the magnetic circuit will continuously increase. Actually, the alternating current will exert a small force on piston 140 which helps keep it in its reset position despite gravitational forces or inertial forces due to changing direction of the vehicle. This force, however, is so small in relation to the force exerted by the fluid fuel during an injection pulse that it may be ignored at that time.

As will be demonstrated at a later point in the specification, during normal operation of the sensing unit 130, magnetic piston 140 will never move farther to the right from the stopped position than the fuel itself moves through the bore of the predetermined inner diameter during a fuel injection pulse of maximum fuel quantity. Therefore, the inner bore of housing member 150 is provided with sufficient axial length that piston 140 will never, in normal operation, reach stop member 142. Stop member 142 is included in case there is a failure of the electronic circuitry or other failure such that piston 140 cannot be moved back to the left into its stopped position. In that case, the fuel from several injection pulses will move piston 140 into engagement with stop member 142. With piston 140 in this position, it is desirable that minimal interference with the free flow of fuel in the sensing unit 130 be provided.

Figure 7:
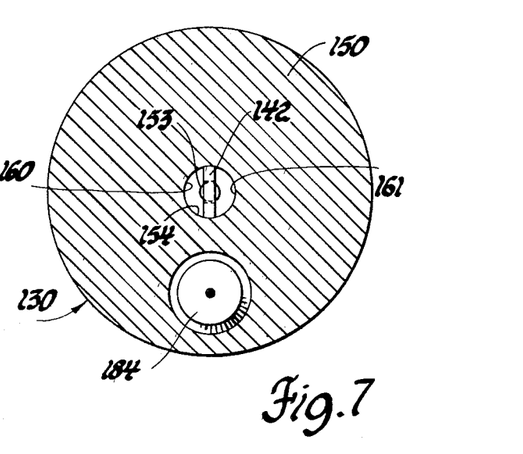
FIG. 7 is a section view along line 7—7 in FIG. 5.

Therefore, as seen in FIG. 7, U-shaped stop member 142 defines openings 160 and 161 within the axial bore 154 through which fuel may flow past stop member 142. In addition, as shown in FIG. 5, stop member 142 includes an opening 162 which permits said fuel to flow unrestricted into bore 153. Furthermore, magnetic polepiece 143 and bore member 137 are provided with a plurality of axially extending openings 164 and 165, respectively. In this embodiment, there are three each of said openings spaced at 120° intervals around the predetermined inner diameter of the central axial bore. Openings 164 extend axially entirely through magnetic polepiece 143; but openings 165 communicate with openings 164 and extend only partially (5.3 cm) axially into bore member 37. The purpose of openings 164 and 165 is to allow virtually unrestricted fuel flow around piston 140 when it is abutting stop 142. Thus, openings 165 extend into bore member 173 axially only as far as necessary to clear the left hand end of piston 140 in said position. Therefore, during normal operation of said sensing unit 130, said openings will not affect the desired restriction to fuel flow around piston 140.

An electrical fitting 184 in housing member 150 provides an outlet for the electrical connections between coil 146 and the controlling electric circuit shown in FIG. 3. No seal is needed since coil 146 itself is outside the sealed portion of sensing unit 130.

Figure 8:
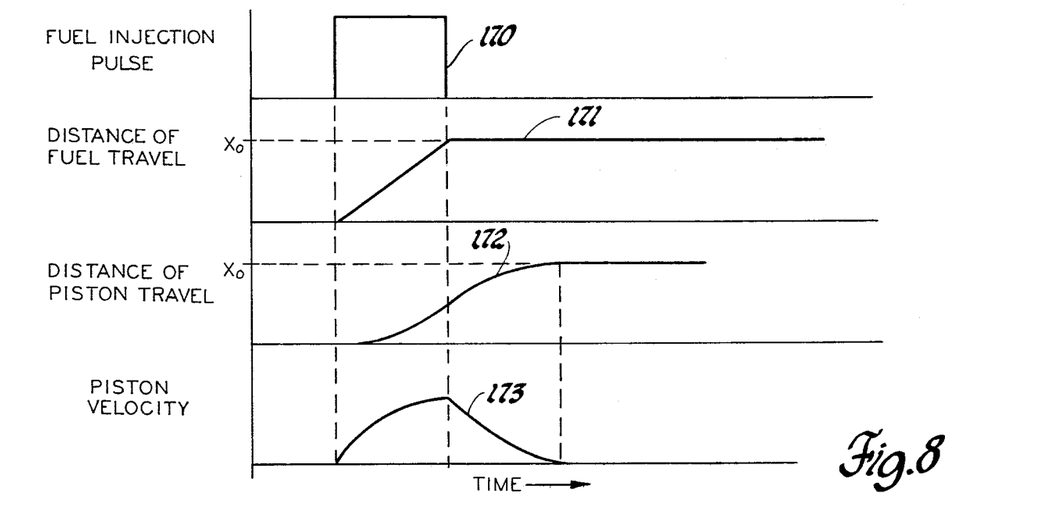
FIG. 8 shows a series of time plots describing the axial movement of the piston in the sensing unit of FIG. 5 is response to a fuel injection pulse.

The response of piston 140 to a fuel injection pulse in the normal operation of sensing unit 130 may be understood with the aid of a simplified analysis and the time plots of FIG. 8. Assuming negligible friction and gravitational forces, the forces acting upon piston 140 are those exerted by the moving fluid fuel. If the fuel moves a distance $X_1$ through a bore of predetermined diameter $A_1$, the piston with a cross-sectional area $A_2$ and mass $M_2$ moves a distance $X_2$, the fuel in the annular region around the piston of cross-sectional area $A_3$ has a mass $M_3$ and moves a distance $X_3$, and the fuel pressure downstream from the piston is $P_0$ while upstream from the piston it is $P_0 + \Delta P$, the equations expressing the relationships between the changes in $X_1$, $X_2$ and $X_3$ are the following:

$$X_1 A_1 = X_2 A_2 + X_3 A_3 \tag{1}$$

$$\Delta P A_3 + (\dot{X}_2 - \dot{X}_3)C = M_3 \ddot{X}_3 \tag{2}$$

$$\Delta P A_2 + (\dot{X}_3 - \dot{X}_2)C = M_2 \ddot{X}_2 \tag{3}$$

In these equations, C refers to the drag coefficient between the fuel flowing past the piston and the piston. The solution of these equations in terms of a transfer function between the input $X_1$ corresponding to motion of fuel in the bore and the output $X_2$ corresponding to motion the piston can be expressed in the following form:

$$\frac{X_2}{X_1} = \frac{T_1 s + 1}{T_2 s + 1}, \tag{4}$$

in which:

$$T_1 = \frac{A_2 M_3}{A_1 C} \text{ and} \tag{5}$$

$$T_2 = \left(\frac{A_3}{A_1}\right)^2 \frac{M_2}{C} + \left(\frac{A_2}{A_1}\right)^2 \frac{M_3}{C}. \tag{6}$$

Referring to FIG. 8, time plot 170 shows an assumed fuel injection pulse, which produces a distance $X_1$ of fuel travel through the bore as a function of time as shown in time plot 171. Start and stop of fuel flow are assumed to be instantaneous and axial velocity through the bore is constant during the pulse, producing a total fuel travel of $X_0$ in time a. This variation of $X_1$ can be expressed in the following equation:

$$X_1 = \frac{X_o}{a}[t - (t-a)u(t-a)], \tag{7}$$

wherein a is the time duration of the fuel injection pulse, t is the time variable and $u(t-a)$ is the unit step function at time $t = a$. With this as the input to Equation (4), the output can be expressed in the following equation.

$$X_2 = \frac{X_o}{a}[t - (T_2 - T_1)(1 - \exp(-t/T_2))] - \tag{8}$$

$$\frac{X_o}{a}[(t-a) - (T_2 - T_1)(1 - \exp(-(t-a)/T_2))]u(t-a)$$

The result of this equation can be shown, for one set of values of the constants $T_1$ and $T_2$, in time plot 172 of FIG. 8. Since $T_1$ and $T_2$ are constants which depend upon the constant physical parameters of cross-sectional areas, masses and drag coefficient, the precise shape of time plot 172 will depend upon these physical parameters. However, it can be seen that, whatever the values of $T_1$ and $T_2$ or the precise shape of time plot 172, the distance of piston travel will always approach $X_0$ as a limiting value. Only the time that it takes to approach said limiting value will vary. Simply put, if piston 140 responds very quickly to changes in velocity of the fluid flowing through the bore, there will be very little lag in the initial acceleration of the piston at the beginning of the fuel injection pulse, the piston will move essentially with the fluid until the end of the fuel injection pulse and there will be very little overshoot of the piston when the fluid stops moving. The piston will thus have travelled the distance $X_0$ in very little more time than required by the fluid to travel the distance. However, if the piston responds rather slowly to the forces of the moving fluid, it will reach a much slower velocity and travel a shorter distance during the fuel injection pulse; however, there will be a longer period of overshoot when the fluid stops moving so that the total distance travelled will be the same. The time that the piston takes to move the total distance in the latter case, however, will be significantly longer. Since only a limited time is available between fuel injection pulses of a single cylinder in a multicylinder internal combustion engine, the physical parameters that determine time constants $T_1$ and $T_2$ must be such as to allow a sufficient time after the fuel injection pulse for the piston travel to become usefully close to its assymptotic limit $X_0$ in addition to sufficient additional time to pull the piston back before the next fuel injection pulse begins.

A multicylinder diesel engine in which each cylinder is fired every other revolution provides, at 3,000 rpm, approximately 40 milliseconds between fuel injection events with correspondingly greater time periods at lower engine rotational speeds. An analysis of the sensing unit of this invention using realistic materials and tolerances provides a worst case pull back time of approximately 22 milliseconds. Actual calculations of time constants $T_1$ and $T_2$ for the apparatus described above indicate expected values substantially less than a millisecond. Assuming that the duration of the injection pulse itself will be a millisecond or two at most, a conservative estimate of approximately 15 milliseconds of overshoot time is available in the worst case. This is many times the duration of the injection pulse itself and orders of magnitude longer than the computed value of time constants $T_1$ and $T_2$. One might expect even better results with further development and refinement.

The embodiments of the invention in which an exclusive property or privilege is claimed are defined as follows:

1. Fuel per pulse sensing apparatus for a fuel line with a fuel injector in an internal combustion engine pulse fuel injection system comprising, in combination:

a body inserted in the fuel line, the body defining a cylindrical bore with an inlet and outlet at opposite axial ends thereof;

a magnetic piston axially movable in the bore to and from a stopped position, the piston having an outer diameter of such size in relation to the inner diameter of the cylindrical bore that fluid flow past the piston exerts an axial force thereon;

means comprising, with the piston, a magnetic circuit including an actuating coil having an inductance varying with axial piston position over the range of piston movement resulting from a fuel injection pulse;

reset means effective, before each injection event to apply an electrical current to the coil so as to move the piston to its stopped position;

means effective, at least when the piston is within said range of piston movement, to measure a parameter varying with the inductance of the coil and to determine therefrom substantially how far the piston moves axially in response to a fuel injection pulse, whereby the injected fuel quantity is known.

2. Fuel per pulse sensing apparatus for a fuel line with a fuel injector in an internal combustion engine pulse fuel injection system comprising, in combination:

a body inserted in the fuel line, the body defining a cylindrical bore with an inlet and outlet at opposite axial ends thereof;

a magnetic piston axially movable in the bore to and from a stopped position, the piston having an outer diameter of such size in relation to the inner diameter of the cylindrical bore that fluid flow past the piston exerts an axial force thereon;

means comprising, with the piston, a magnetic circuit including an actuating coil having an inductance varying with axial piston position over the range of piston movement resulting from a fuel injection pulse;

reset means effective before each injection event to apply an electrical current to the coil so as to move the piston to its stopped position;

means effective, at least when the piston is within said range of piston movement to measure a parameter varying with the inductance of the coil and to determine therefrom substantially how far the piston moves axially and the time of initial piston axial movement in response to a fuel injection pulse, whereby the injected fuel quantity and time of injection are known.

3. Fuel per pulse sensing apparatus for a fuel line with a fuel injector in an internal combustion engine pulse fuel injection system comprising in combination:

a body inserted in the fuel line, the body defining a cylindrical bore with an inlet and outlet at opposite axial ends thereof;

a magnetic piston axially movable in the bore to and from a stopped position, the piston having an outer diameter of such size in relation to the inner diameter of the cylindrical bore that fluid flow past the piston exerts an axial force thereon;

means comprising with the piston, a magnetic circuit including an actuating coil having an inductance varying with axial piston position over the range of piston movement resulting from a fuel injection pulse;

reset means effective, before each injection event to apply a strong electrical current to the coil so as to move the piston to its stopped position;

means effective, at least when the piston is within said range of piston movement, to apply an alternating current weaker than the strong current to the actuating coil, measure the voltage across said coil and determine from said voltage and the time rate of change thereof substantially how far the piston moves axially in the response to a fuel injection pulse, whereby the injected fuel quantity is known.

4. Fuel per pulse sensing apparatus for a fuel line with a fuel injector in an internal combustion engine pulse fuel injection system comprising in combination:

a body inserted in the fuel line, the body defining a cylindrical bore with an inlet and outlet at opposite axial ends thereof;

a magnetic piston axially movable in the bore to and from a stopped position, the piston having an outer diameter of such size in relation to the inner diameter of the cylindrical bore that fluid flow past the piston exerts an axial force thereon;

means comprising, with the piston, a magnetic circuit including an actuating coil having an inductance varying with axial piston position over the range of piston movement resulting from a fuel injection pulse;

reset means effective, before each injection event to apply a strong electrical current to the coil so as to move the piston to its stopped position;

means effective, at least when the piston is within said range of piston movement, to apply an alternating current substantially weaker than the strong current to the coil, measure the voltage across the coil and the time rate of change of said voltage and determine from said voltage when the time rate of change of said voltage has decreased sufficiently to indicate an end of axial piston movement in response to a fuel injection pulse substantially how far the piston moves axially in response to said fuel injection pulse, whereby the injected fuel quantity is known.

5. Fuel per pulse sensing apparatus for a fuel line with a fuel injector in an internal combustion engine pulse fuel injection system comprising, in combination:

a body inserted in the fuel line, the body defining a cylindrical bore with an inlet and an outlet at opposite axial ends thereof;

a magnetic piston axially movable in the bore to and from a stopped position blocking the inlet, the piston having an outer diameter of such size in relation to the inner diameter of the bore that fluid flow past the piston exerts an axial force thereon;

means comprising, with the piston, a magnetic circuit including an actuating coil having an inductance varying with axial piston position over the range of piston movement resulting from a fuel injection pulse;

means effective, before each injection event, to apply a strong electrical current to the coil effective to move the piston to its stopped position;

means effective to apply an alternating electrical current substantially weaker than the strong electrical current to the coil; and means effective, with the alternating current applied and the sensed voltage greater than a first predetermined reference, to indicate the sensed voltage at the moment when the time rate of voltage change decreases below a second predetermined reference near zero, which voltage indicates the fuel quantity injected.

6. Start and quantity of injection sensing apparatus for a fuel line with a fuel injector in an internal combustion engine pulse fuel injection system comprising, in combination:

a body inserted in the fuel line, the body defining a cylindrical bore with an inlet and an outlet at opposite axial ends thereof;

a magnetic piston axially movable in the bore to and from a stopped position blocking the inlet, the piston having an outer diameter of such size in relation to the inner diameter of the bore that fluid flow past the piston exerts an axial force thereon;

means comprising, with the piston, a magnetic circuit including an actuating coil having an inductance varying with axial piston position over the range of piston movement resulting from a fuel injection pulse;

means effective, before each injection event, to apply a strong direct electrical current to the coil effective to move the piston to its stopped position;

means effective to apply an alternating electrical current substantially weaker than the direct electrical current to the coil, sense the voltage thereacross and generate a start of injection signal when the voltage exceeds a first predetermined reference; and means effective, with the alternating current applied and the sensed voltage greater than the first predetermined reference, to indicate the sensed voltage at the moment when the time rate of voltage change decreases below a second predetermined reference, which voltage indicates the fuel quantity injected.

7. Start and quantity of injection sensing apparatus for a fuel line with a fuel injector in an internal combustion engine pulse fuel injection system comprising, in combination:

a body inserted in the fuel line, the body defining a cylindrical bore with an inlet and an outlet at opposite axial ends thereof;

a magnetic piston axially movable in the bore to and from a stopped position blocking the inlet, the piston being adapted to allow fluid flow therepast when not in the stopped position;

means comprising, with the piston, a magnetic circuit including an actuating coil having an inductance varying with axial piston position;

means effective, before each injection event, to apply a direct electrical current to the coil in polarity effective to move the piston to its stopped position;

means effective to apply an alternating electrical current to the coil, sense the voltage thereacross and generate a start of injection signal when the voltage exceeds a first predetermined reference; and means effective with the alternating current applied and the sensed voltage greater than the first predetermined reference, to indicate the sensed voltage at the moment when the time rate of voltage change decreases below a second predetermined reference, which voltage indicates the fuel quantity injected.

8. Apparatus for providing an electrical signal the magnitude of which is a function of the amount of fuel injected into an internal combustion engine during a pulse injection pulse comprising, in combination: a fuel injector for supplying fuel to the engine; a fuel injection pump; a fuel line coupling said pump and said injector; a fuel metering device comprising a piston formed of magnetic material disposed within housing means defining a bore in said fuel line, the piston being reciprocable in said bore and being spaced from the bore wall to form a passage for fuel flow thereby; a coil winding disposed about said piston and energizable to shift shifting said piston to a reference position; said piston being shifted away from said reference position and subsequently stopped at a distance corresponding to the volume of fuel injected by changes in fluid forces applied thereto as a result of the initiation and termination of the fuel injection pulse and corresponding opening and closing of the fuel injector, the amount of shift for a given volume of fuel being substantially independent of the time duration of the fuel injector pulse, and means coupled to said coil winding for developing an electrical signal that is a function of the displacement of said piston from said reference position.

* * * * *